P. Schumacher,

Ice Cream Freezer.

No. 96,489. Patented Nov. 2, 1869.

Witnesses:
E. Wolff
Alex F. Roberts

Inventor:
P. Schumacher
Per [signature]
Attorneys.

United States Patent Office.

PAUL SCHUMACHER, OF NEW YORK, N. Y.

*Letters Patent No. 96,489, dated November 2, 1869.*

IMPROVED ICE-CREAM FREEZER.

The Schedule referred to in these Letters Patent and making part of the same.

*To all whom it may concern:*

Be it known that I, PAUL SCHUMACHER, of the city, county, and State of New York, have invented a new and improved Freezer; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
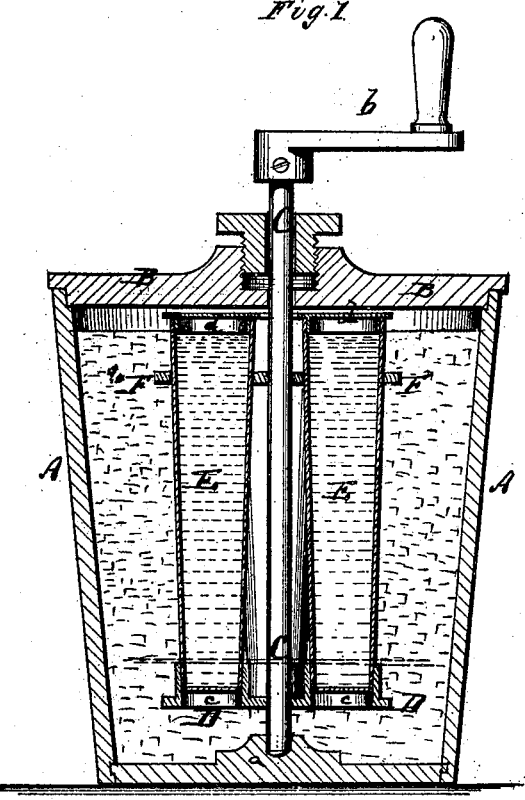
Figure 1 represents a vertical central section of my improved freezer.
Figure 2:
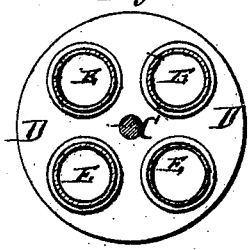
Figure 2 is a detail horizontal section of the same.

This invention relates to a new apparatus, which can be used for freezing ice-cream and other suitable substances.

The object of the invention is to obtain a proportionately large cooling-surface to the quantity of material to be cooled.

The invention consists in the arrangement of a series of cylindrical vessels, set upright into disks or frames, which are fastened to the revolving shaft, by which they are set in motion.

A, in the drawing, represents a vessel made in form of an inverted truncated cone, or of other suitable shape, and provided with a close-fitting cover, B.

C is a vertical shaft, fitted centrally into the vessel A, through the cover B, its lower end resting upon a step, *a*, placed upon the bottom of the vessel A.

The shaft has a crank, *b*, at its upper end, or other suitable driving-gear, by means of which it may be revolved.

Near the lower end of the shaft is mounted upon the same, a disk, D, which has recesses, apertures, or cups, *c*, to receive the lower ends of four, more or less, cylindrical or slightly conical vessels, E E.

The upper parts of these vessels E are fitted through an upper perforated plate, F, which is mounted upon the shaft C.

The vessels E reach nearly to the cover B, and each of them is separately closed by a cover, *d*.

The cream or other matter to be frozen is first put into the vessel E.

They are then closed and put into the disks F D.

The vessel A is next filled with the cooling-liquid, nearly to the top of the vessels E, and then the cover B is put on.

When the shaft is set in motion, the vessels E will be carried round with it, and will expose their surfaces to the action of the cooling-liquid or matter which is agitated by them.

Having thus described my invention,

I claim as new, and desire to secure by Letters Patent—

The arrangement of the receiving-vessels E E, in a suspended position about the shaft C and above the bottom of the chamber A, so as to rotate in and agitate the cooling-liquid, all as shown and described.

The above specification of my invention signed by me, this 21st day of September, 1869.

PAUL SCHUMACHER.

Witnesses:
  GEO. W MABEE,
  ALEX. F. ROBERTS.